United States Patent
Yuen

(10) Patent No.: US 9,608,802 B2
(45) Date of Patent: Mar. 28, 2017

(54) DECOY BITS METHOD FOR DIRECT ENCRYPTION AND KEY GENERATION

(71) Applicant: Quantum Advance Technology, Inc., Glenview, IL (US)

(72) Inventor: Horace P Yuen, Glenview, IL (US)

(73) Assignee: Quantum Advance Technology, Inc., Glenview, IL (US)

( * ) Notice: Subject to any disclaimer, the term of this patent is extended or adjusted under 35 U.S.C. 154(b) by 504 days.

(21) Appl. No.: 14/198,924

(22) Filed: Mar. 6, 2014

(65) Prior Publication Data

US 2016/0285621 A1   Sep. 29, 2016

Related U.S. Application Data

(60) Provisional application No. 61/776,299, filed on Mar. 11, 2013.

(51) Int. Cl.
| | | |
|---|---|---|
| *G06F 11/30* | (2006.01) | |
| *G06F 12/14* | (2006.01) | |
| *H04L 9/06* | (2006.01) | |
| *H04L 9/00* | (2006.01) | |

(52) U.S. Cl.
CPC .............. *H04L 9/06* (2013.01); *H04L 9/002* (2013.01); *H04L 9/065* (2013.01); *H04L 9/0618* (2013.01); *H04L 9/0656* (2013.01)

(58) Field of Classification Search
CPC .................................................... H04L 9/0656
USPC ....................................................... 713/189
See application file for complete search history.

(56) References Cited

U.S. PATENT DOCUMENTS

| | | | | |
|---|---|---|---|---|
| 6,021,203 A | * | 2/2000 | Douceur | H04L 9/0656 380/252 |
| 6,748,081 B1 | * | 6/2004 | Dultz | C09K 19/02 380/277 |
| 7,831,049 B1 | * | 11/2010 | Kanter | H04K 1/006 380/256 |
| 8,934,633 B2 | * | 1/2015 | Tomaru | H04L 9/08 340/5.26 |
| 2006/0059368 A1 | * | 3/2006 | Fayad | G06F 21/72 713/189 |
| 2008/0043871 A1 | * | 2/2008 | Latouche | H04L 27/186 375/261 |

(Continued)

OTHER PUBLICATIONS

L. Chen and G. Gong, Communication System Security, CRC Press, 2012. p. 52-54.

(Continued)

*Primary Examiner* — Taghi Arani
*Assistant Examiner* — Khalil Naghdali
(74) *Attorney, Agent, or Firm* — IPro, PLLC; Qian Gu; Na Xu

(57) ABSTRACT

A new cryptographic technique is disclosed, called decoy bits method, which can be used to obtain near ideal information theoretic security in both quantum and classical key generation and data encryption, not only for raw security but also under known-plaintext attacks. The technique relates to a method of data encryption by insertion of random bits, called decoy bits, into a data sequence whereby the decoy bits are discarded upon decryption. The positions of the decoy bits are determined by a decoy position determining mechanism. This method can be used in conjunction with other standards of encryption to increase security.

23 Claims, 5 Drawing Sheets

(56) References Cited

U.S. PATENT DOCUMENTS

| | | | |
|---|---|---|---|
| 2009/0003591 A1* | 1/2009 | Murakami | H04L 9/0852 380/28 |
| 2013/0031364 A1* | 1/2013 | Glew | G06F 21/72 713/162 |
| 2013/0251145 A1* | 9/2013 | Lowans | H04L 9/0838 380/44 |
| 2013/0346756 A1* | 12/2013 | Cook | G06F 21/00 713/189 |

OTHER PUBLICATIONS

H.P. Yuen, Phys. Rev. A 82, 062304 (2010).
P. Yuen, IEEE J. Sel. Top. in Quant. Electron. 15, 1630 (2009).
N. Gisin, G. Ribordy, W. Tittel, and H. Zbindeu, Rev. Mod. Phys, 74, 145 (2002).
H.P. Yuen, arXiv:1210.2804v1 (2012).
E.Corndorf, C.Liang, G.S.Kanter, P.Kumar, and H.P.Yuen, Phys. Rev. A 71, 062306 (2005).
O. Hirota, M. Sohma, M. fuse, and K. Kato, Phys. Rev. A 72, 022335 (2005).
H.P. Yuen, arXiv: 1205.5065v2 (2012).
H.P. Yuen, arXiv: 0109055 (2001).
W.Y. Hwang, Phys. Rev. Lett. 91, 057901 (2003).
H.P. Yuen, 1207.6985v3 (2012).
C.E. Shannon, Bell Syst. Tech. J. 28, 456 (1949).
H.P. Yuen, R. Nair, E. Corndorf, G. Kanter, and P. Kumar, Quant. Inf. Comp. 6, 561 (2006).
H.P. Yuen, R. Kennedy, and M. Lax, IEEE Trans. Inf. Theory 21, 125 (1975).
H.P. Yuen, arXiv:1205.3820v2 (2012).

* cited by examiner

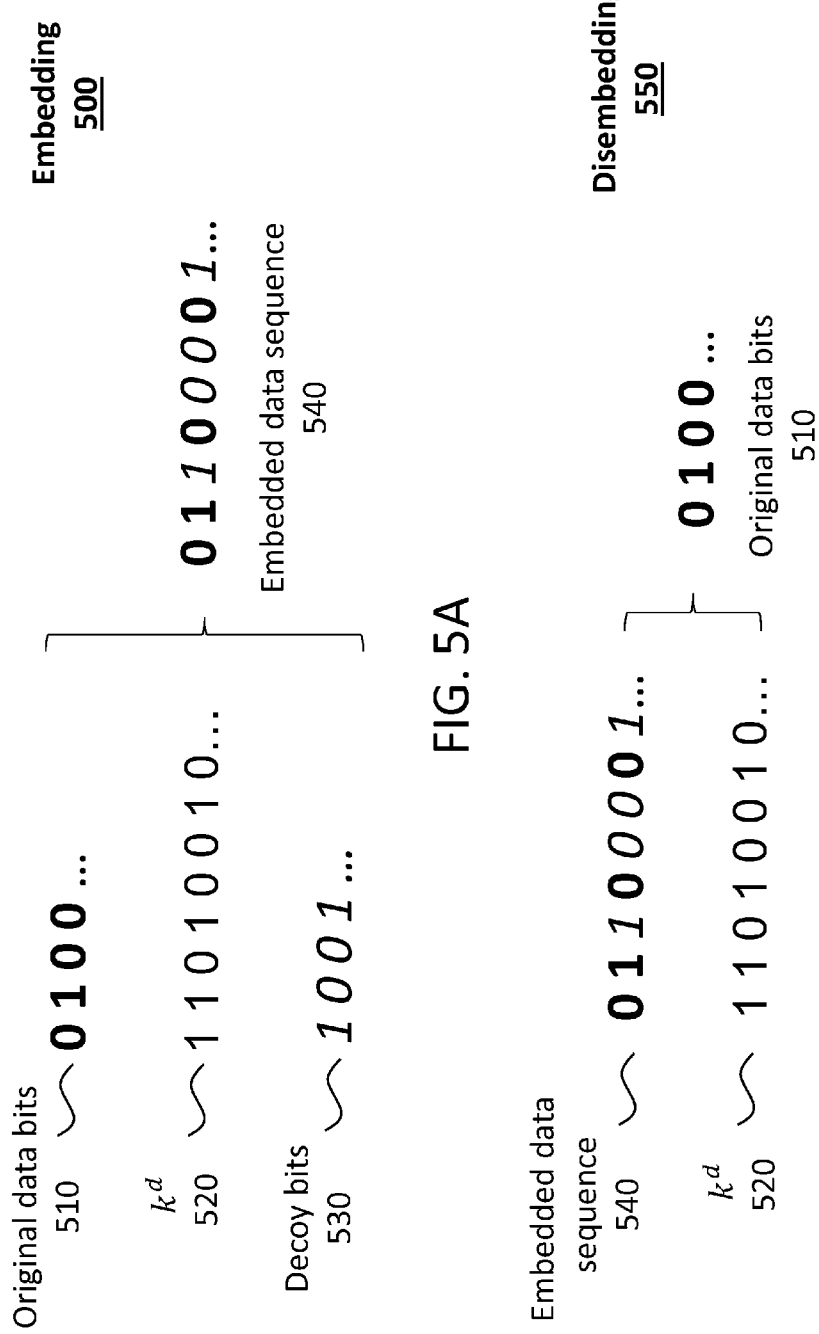

DECOY BITS METHOD FOR DIRECT ENCRYPTION AND KEY GENERATION

CROSS REFERENCE TO RELATED APPLICATIONS

This application claims the benefit of U.S. Provisional Application No. 61/776,299, filed Mar. 11, 2013, which is incorporated by reference in its entirety.

STATEMENT OF GOVERNMENT INTEREST

This invention was made with government support under grant number FA9550-09-1-0593 awarded by the Air Force Office of Scientific Research. The government has certain rights in the invention.

BACKGROUND OF THE INVENTION

1. Field of the Invention

This invention relates generally to data encryption and cryptographic methods.

2. Description of the Related Art

In current practice of data encryption and key generation which is based on mathematical properties of classical data, there is no information theoretic security (ITS) under known-plaintext attacks (KPA) by an adversary Eve, or even just for raw security before the generated key K is used in public key systems. Instead, security is based on the computational complexity of obtaining the correct answer on a mathematical problem related to the cryptographic protocol employed. Such complexity-based security (CBS) may be insecure against future development of computational power and algorithms, and improvement on such security predicament is sought for a variety of applications.

New development in physical cryptography that utilizes either classical noise or quantum effect show some promise of obtaining ITS but is beset with fundamental security issues and efficiency problems. In particular, there are serious efficiency and security issues in connection with the quantum key distribution (QKD) protocol BB84. The KCQ (keyed communication in quantum noise) approach has been experimentally developed to a less extent, and generally security proof is yet to be obtained. A most serious difficulty for such proof in both QKD and KCQ is the correlations between bits in the cryptosystem, as it is in classical and conventional mathematical cryptography.

Therefore, there is a need for cryptographic methods that yield quantifiable general security for almost any classical or quantum protocol of data encryption and key generation.

SUMMARY OF THE INVENTION

The present invention overcomes the limitations of the prior art by providing a cryptographic method that yields quantifiable general security for classical and quantum data encryption and key generation.

In one embodiment, the method includes the following steps: receiving a sequence of data bits, generating a sequence of decoy bits, and embedding the sequence of data bits among the sequence of decoy bits based on a decoy position determining mechanism to produce an embedded data sequence. In said embodiment, the sequence of data bits is the input, and the embedded data sequence is the output.

In one implementation, the embedded data sequence is produced by first generating a pseudorandom number sequence based on an encryption key and an encryption mechanism, and then embedding the sequence of data bits among the sequence of decoy bits based on the pseudorandom number sequence.

In one embodiment, the sequence of decoy bits is generated in a pseudorandom manner. In another embodiment, the sequence of decoy bits is generated in a true random manner.

In one embodiment, the received sequence of data bits is an encrypted data sequence which is encrypted using a separate encryption key and a separate encryption mechanism. In another embodiment, the embedded data sequence is further encrypted using a distinct encryption key and a distinct encryption mechanism. Each of the encryption keys may be a sequence of true random numbers. The running keys may be pseudorandom numbers generated through the true random number keys. In one approach, the running keys can be obtained by using Advanced Encryption Standard (AES). In another approach, the running keys can be obtained by using Linear Feedback Shift Register (LFSR) or nonlinear combinations thereof.

The ratio of data bits to total bits in the ciphertext is defined as the data rate. The ratio of decoy bits to total bits in the ciphertext is defined as the decoy rate. Generally, the data rate is adjustable between 0 and 1, and so is the decoy rate. In one embodiment, the method includes using a data rate of 90% or higher. In another embodiment, the method includes using a data rate of 50% or lower. In yet another embodiment, the method includes using a data rate of 0.1% or lower.

In one embodiment, the method may be implemented for data storage. In another embodiment, the method may be implemented for medical data. In yet another embodiment, the method may be implemented for financial data.

Other aspects of the invention include methods, devices, systems, applications, variations and improvements related to the concepts described above.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 5A is a detailed example of embedding original data bits among a sequence of decoy bits to produce an embedded data sequence.

FIG. 5B is a detailed example of disembedding original data bits from the embedded data sequence.

Figure 1:
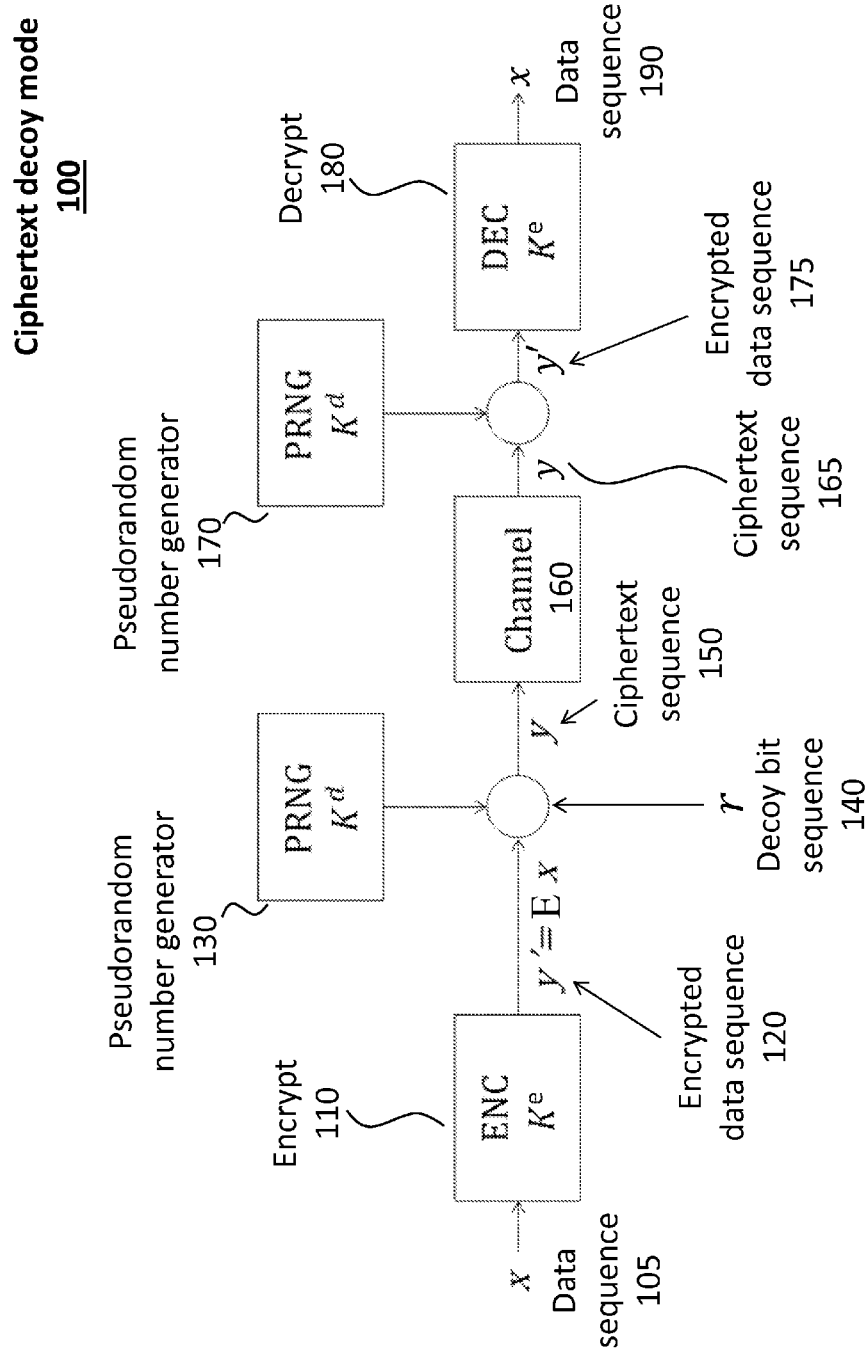
FIG. 1 depicts the decoy bits method in the ciphertext decoy mode used to transmit data in a communication channel.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed. To facilitate understanding, identical reference numerals have been used where possible, to designate identical elements that are common to the figures.

This disclosure relates to a novel cryptographic technique, called the decoy bits method (DBM), which yields quantifiable general security for almost any classical or quantum protocol of data encryption and key generation when it is deployed on top. At the expense of a small reduction in data rate, it offers tremendous provable security gain.

In one embodiment, the DBM comprises embedding the original data among decoy bits whose bit positions are determined through a pseudorandom number generator (PRNG) driven by a shared secret key between the users. The bits in the decoy positions are filled from a true random number generator (TRNG). In other embodiments, PRNG can also be used to fill the bits in the decoy positions albeit with less security. In the quantum case, ITS is obtained for both TRNG and PRNG even under KPA. In the classical case, only CBS of different levels can be so obtained under KPA but the levels are exponential in a proper key length. This DBM achieves ITS directly in the quantum case but also indirectly for the classical situation. In particular, classical key generation can be so obtained, which is more secure than all known public key techniques.

Classical and Quantum Data Encryption and Key Generation

A classical randomized encrypter on data sequence x with ciphertext y can be generally represented as follows, $$y=E(x,k,r) \quad (1)$$

where E is the overall encryption map, k the overall shared secret key, and r a randomizer only the transmitter user A may (or may not) know. Unique decryption means $$x=D(y,k) \quad (2)$$

for an openly known function D that gives the correct x without knowing r. We call this classical direct encryption (CDE). If the cryptosystem is a quantum one so that density operators take the place of classical probability distributions, it is called quantum direct encryption (QDE), a typical example of which is the PSK-Y00 (or Alpha-Eta) cryptosystem. The term raw security for direct encryption refers to the situation when the eavesdropper Eve has access only to the ciphertext random variable (sequence) Y and has no information on X (the plaintext random variable) which is the uniformly random variable U to her. In that case it is typical that the ciphertext leaks no information about k to Eve. The ciphertext is always openly known. In KPA, some subsequence of x is known to Eve so that she could try to gain information or even determine k with the known ciphertext, say in the conventional symmetric key ciphers AES or standard stream ciphers from PRNG, and then decrypt the rest of x. We will not need to distinguish the situation where Eve only has statistical knowledge on X and let KPA stand for the case where some specific subsequence of x is known exactly to Eve.

One can do key generation from direct encryption, in that case privacy amplification can be employed to help improve security. In quantum key generation (QKG) a shared secret key $K^g$ is to be generated between the users A and B which possesses ITS, that is, probabilistic uncertainty to Eve even when she has unlimited computational power. This uncertainty may not be dependent from that of k shared by the users, i.e., $K^g$ is a fresh key. Such fresh key generation cannot be so obtained with certainty classically as a consequence of the Shannon limit, and it turns out it cannot be obtained in QKD or KCQ either, due to the necessity of a shared secret key for open message authentication during protocol execution in the former and the explicit use of a shared secret key K in the latter. However, it is possible to generate a fresh key with a practically certain probability, i.e., obtaining a key that has whatever obtainable ITS level with near or practical certainty.

It is important to note that while no KPA can be launched against $K^g$ during the key generation process, KPA can be launched with Eve's probe set when $K^g$ is used. Thus, defense against KPA is necessary for QKG as in QDE or CDE. For CBS the security criterion is the number of computational steps needed to get the data or the key. In QKG the operational criteria have been given in terms of Eve's sequence success probabilities and her position-averaged bit error rate (BER) in estimating various parts of $K^g$. It is these criteria that we will use in evaluating the DBM performance.

Before moving onto DBM proper, we note that an exponential CBS in terms of a controllable security parameter is basically as good as ITS. This is because with an ITS security level of n uniform key bits, it just means there are $2^n$ possibilities at Eve's hand. If she can try that one by one, it takes a trial complexity of $2^n$ to guarantee success which is no different from the same level of CBS. Indeed, one can formalize the success probability of any m≤n trials including a single one and get similar guarantee as ITS for exponential CBS from a general trial complexity.

The Decoy Bits Method

The key new feature of the DBM is the introduction of decoy bits in two different possible ways: among the bits in a sequence of data bits or among the bits in an encrypted data sequence. After decryption, the decoy bits are usually discarded. In one embodiment, a PRNG with proper statistical property, which is offered by LFSR, is used to determine which bit positions are the decoy ones.

FIG. 1 depicts the decoy bits method in the ciphertext decoy mode (CDM) 100 used to transmit data in a communication channel, according to one embodiment. The data sequence 105 (represented by x) is first encrypted 110 by a seed key $K^e$ (with its running key $k^e$) and an encryption mechanism, although such a step may be omitted for simpler implementation. The encrypted data sequence 120 (represented by y') can be written as:

$$y'=E(x,k^e,r') \quad (3)$$

where r' simply represents the possibility of randomized encryption for y' and is just included for generality. In alternative embodiments, the randomizer r' may be omitted. In one embodiment, the seed key $K^e$ is a sequence of true random numbers.

In one embodiment, the encrypted data sequence 120 is generated using AES. In another embodiment, the encrypted data sequence 120 is generated using LFSR or nonlinear combinations thereof. In some cases, the encrypted data sequence 120 is generated using a stream cipher. Alternatively, the encrypted data sequence 120 is generated using a block cipher.

In one embodiment, the decoy bit sequence 140 (represented by r) is a sequence of true random numbers generated independently of other system components. The decoy bits are inserted into the encrypted data sequence 120 to produce a ciphertext sequence 150 (represented by y). The positions of the decoy bits are in general determined by a decoy position determining mechanism. In the embodiment depicted in FIG. 1, the positions of the decoy bits are determined by a pseudorandom number sequence generated from a pseudorandom number generator 130 with a seed key $K^d$ and its own encryption mechanism. The seed keys $K^d$ and $K^e$ are independent of each other. In addition, the PRNG 130 employs an encryption mechanism that is also independent of the encryption mechanism in the encryption step 110. The resulting ciphertext sequence 150 has a length n', which is greater than the length n of the encrypted data sequence 120 due to the insertion of decoy bits. The data rate is commonly defined as n/n', and the decoy rate 1−n/n'.

The ciphertext sequence 150 is transmitted through a communication channel 160. The communication channel 160 may include, but is not limited to, audio, visual, electrical, and electromagnetic communication channels. For example, the communication channel may be an optical fiber, an electrical cable, or free space. In one embodiment, classical signals are modulated by the ciphertext sequence 150, transmitted through the communication channel 160, and demodulated back into the ciphertext sequence 165 at the receiving end of the communication channel. In another embodiment, quantum signals are modulated by the ciphertext sequence 150, transmitted through the communication channel 160, and demodulated back into the ciphertext sequence 165. The modulation and demodulation modules are not depicted in FIG. 1 for the sake of simplicity.

If there is no error in the transmission process, the received ciphertext sequence 165 is exactly the same as the transmitted ciphertext sequence 150. A pseudorandom number generator 170 is employed to disembed the decoy bits from the ciphertext sequence 165, resulting in an encrypted data sequence 175. In general, the positions of the decoy bits are determined from the same decoy position determining mechanism used to embed the decoy bits. In the embodiment depicted in FIG. 1, the PRNG 170 shares the same seed key $K^d$ and the same encryption mechanism as the PRNG 130. The decoy positions are determined from the PRNG 170, and the decoy bits are discarded. The encrypted data sequence 175 is then decrypted 180 by using the shared seed key $K^e$ (and the shared encryption mechanism as the encryption step 110) to obtain a data sequence 190. This decryption step 180 may be omitted if the encryption step 110 is omitted for simpler implementation.

Figure 2:
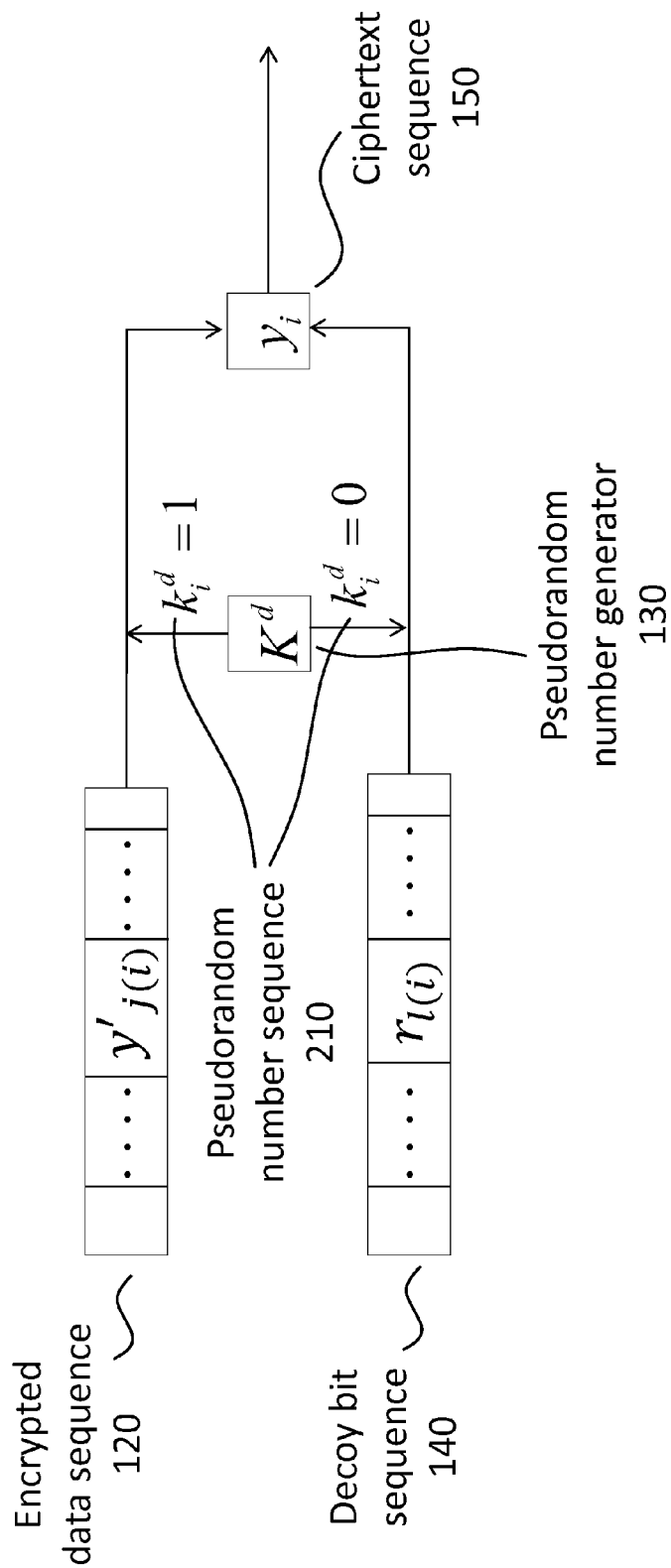
FIG. 2 illustrates detailed operation of the decoy bits method in the ciphertext decoy mode.

FIG. 2 illustrates detailed operation of the decoy bits method in the ciphertext decoy mode. The encrypted data sequence 120 (y') and the decoy bit sequence 140 (r) line up in buffers to be picked in succession by the pseudorandom number sequence 210 ($k^d$) which is generated from the pseudorandom number generator 130 with a seed key $K^d$. In one embodiment, the positions of 1 bits in the pseudorandom number sequence $k^d$ determine positions of the data bits (from the encrypted data sequence 120) in the ciphertext sequence 150, and the positions of 0 bits in the pseudorandom number sequence $k^d$ determine positions of the decoy bits (from the decoy bit sequence 140) in the ciphertext sequence 150. In this embodiment, the mathematical representation of DBM-CDM is, with $k_i^d$ being the $i^{th}$ output bit of the PRNG 130:

$$y_i = y'_{j(i)} \quad \text{if } k_i^d = 1 \tag{4}$$
$$= r_{l(i)} \quad \text{if } k_i^d = 0$$

In Eq. (4), the map j(i) is the bit position of the encrypted data sequence 120 which is equal numerically to the number of $k_i^d=1$ positions that have occurred up to the $i^{th}$ place in the pseudorandom number sequence 210. Similarly, the map l(i) is the bit position of the decoy bit sequence 140 which is equal numerically to the number of $k_i^d=0$ positions that have occurred up to the $i^{th}$ place in the pseudorandom number sequence 210. In this embodiment, what is done is simply to fill in random numbers (from the decoy bit sequence 140) at the decoy positions determined by the $k_i^d=0$ positions in the $k^d$-sequence and fill in successively the y'-sequence bits in the non-decoy or message positions (determined by the $k_i^d=1$ positions in the $k^d$-sequence).

Figure 3:
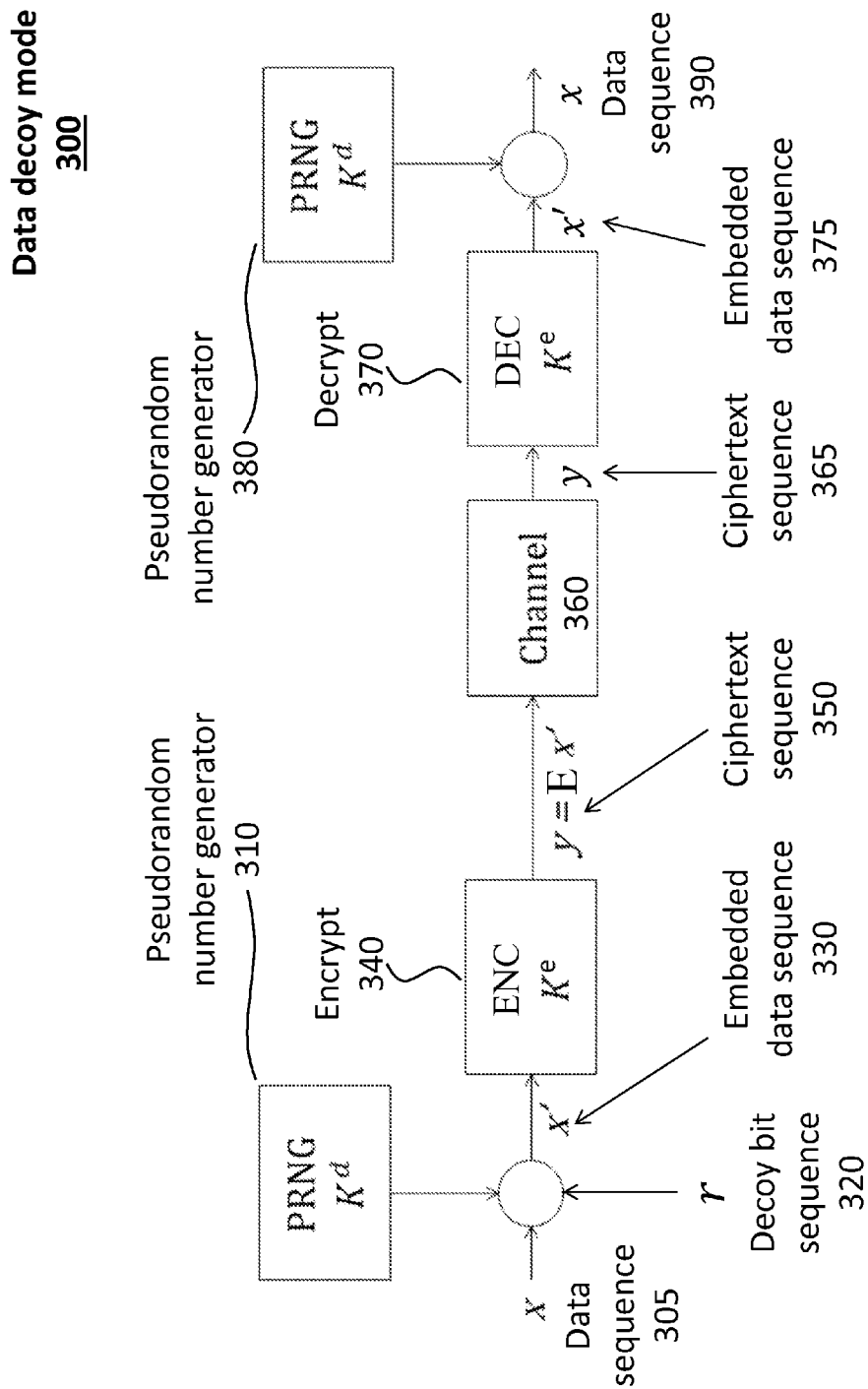
FIG. 3 depicts the decoy bits method in the data decoy mode used to transmit data in a communication channel.

FIG. 3 depicts the decoy bits method in the data decoy mode (DDM) 300 used to transmit data in a communication channel, according to one embodiment. In one embodiment, the decoy bit sequence 320 (represented by r) is a sequence of true random numbers generated independently of other system components. The decoy bits are inserted into a data sequence 305 to produce an embedded data sequence 330 (represented by x'). The positions of the decoy bits are in general determined by a decoy position determining mechanism. In the embodiment depicted in FIG. 3, the positions of the decoy bits are determined by a pseudorandom number sequence generated from a pseudorandom number generator 310 with a seed key $K^d$ and an encryption mechanism. The resulting embedded data sequence 330 has a length n', which is greater than the length n of the data sequence 305 due to the insertion of decoy bits.

The embedded data sequence 335 is further encrypted 340 by a seed key $K^e$ (with its running key $k^e$) and its own encryption mechanism, resulting in a ciphertext sequence 350 which typically has the same length n' as the embedded data sequence 335. The seed keys $K^e$ and $K^d$ are independent of each other. In addition, the encryption mechanism in the encryption step 340 is also independent of the encryption mechanism employed by the PRNG 310. In this embodiment, the data rate is defined as n/n', and the decoy rate 1−n/n'. In some cases, the encryption step 340 may be omitted for simpler implementation. The ciphertext sequence 350 (represented by y) can be written as:

$$y = E(x', k^e, r') \tag{5}$$

where r' simply represents the possibility of randomized encryption for y' and is just included for generality. In alternative embodiments, the randomizer r' may be omitted. In one embodiment, the seed key $K^e$ is a sequence of true random numbers.

In one embodiment, the ciphertext sequence 350 is generated using AES. In another embodiment, the ciphertext sequence 350 is generated using LFSR or nonlinear combinations thereof. In some cases, the ciphertext sequence 350 is generated using a stream cipher. Alternatively, the ciphertext sequence 350 is generated using a block cipher.

The ciphertext sequence 350 is transmitted through a communication channel 360. The communication channel 360 may include, but is not limited to, audio, visual, electrical, and electromagnetic communication channels. For example, the communication channel may be an optical fiber, an electrical cable, or free space. In one embodiment, classical signals are modulated by the ciphertext sequence 350, transmitted through the communication channel 360, and demodulated back into the ciphertext sequence 365 at the receiving end of the communication channel. In another embodiment, quantum signals are modulated by the ciphertext sequence 350, transmitted through the communication channel 360, and demodulated back into the ciphertext sequence 365. The modulation and demodulation modules are not depicted in FIG. 3 for the sake of simplicity.

If there is no error in the transmission process, the received ciphertext sequence 365 is exactly the same as the transmitted ciphertext sequence 350. The ciphertext sequence 365 is decrypted 370 by using the shared seed key $K^e$ (and the share encryption mechanism of the encryption step 340) to obtain an embedded data sequence 375. This decryption step 370 may be omitted if the encryption step 340 is omitted for simpler implementation. A pseudorandom number generator 380 is employed to disembed the decoy bits from the embedded data sequence 375, resulting in a data sequence 390. In general, the positions of the decoy bits are determined from the same decoy position determining mechanism used to embed the decoy bits. In the embodiment depicted in FIG. 3, the PRNG 380 shares the same seed key $K^d$ and the same encryption mechanism as the PRNG 310. The decoy positions are determined from the PRNG 380, and the decoy bits are discarded.

Figure 4:
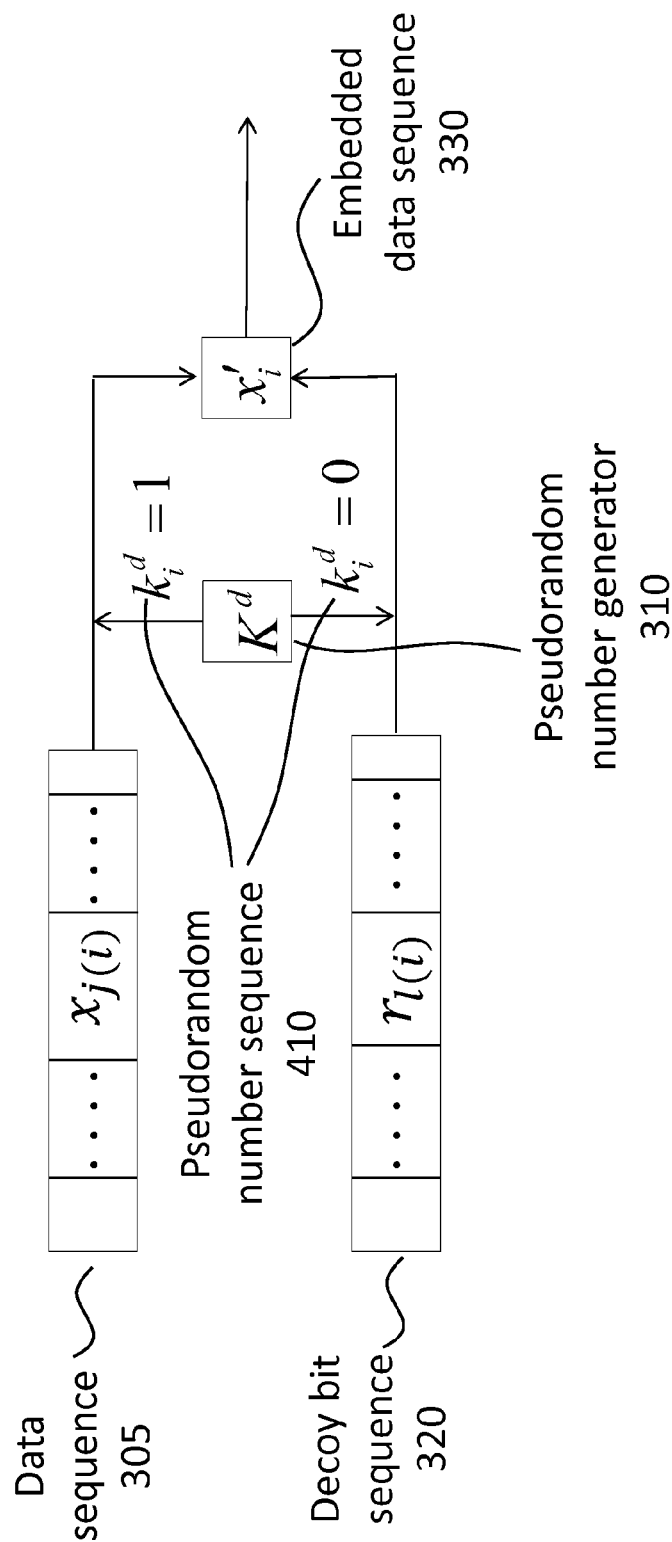
FIG. 4 illustrates detailed operation of the decoy bits method in the data decoy mode.

FIG. 4 illustrates detailed operation of the decoy bits method in the data decoy mode. The data sequence 305 (x') and the decoy bit sequence 320 (r) line up in buffers to be picked in succession by the pseudorandom number sequence 410 ($k^d$) which is generated from the pseudorandom number generator 310 with a seed key $K^d$. In one embodiment, the positions of 1 bits in the pseudorandom number sequence $k^d$ determine positions of the data bits (from the data sequence 305) in the embedded data sequence 330, and the positions of 0 bits in the pseudorandom number sequence $k^d$ determine positions of the decoy bits (from the decoy bit sequence 320) in the embedded data sequence 330. In this embodiment, the mathematical representation of DBM-DDM is, with $k_i^d$ being the $i^{th}$ output bit of the PRNG 310:

$$x'_i = x_{j(i)} \quad \text{if } k_i^d = 1 \quad (6)$$
$$= r_{l(i)} \quad \text{if } k_i^d = 0$$

In Eq. (6), the map j(i) is the bit position of the data sequence 305 which is equal numerically to the number of $k_i^d=1$ positions that have occurred up to the $i^{th}$ place in the pseudorandom number sequence 410. Similarly, the map l(i) is the bit position of the decoy bit sequence 320 which is equal numerically to the number of $k_i^d=0$ positions that have occurred up to the $i^{th}$ place in the pseudorandom number sequence 410. In this embodiment, what is done is simply to fill in random numbers (from the decoy bit sequence 320) at the decoy positions determined by the $k_i^d=0$ positions in the $k^d$-sequence and fill in successively the x-sequence bits in the non-decoy or message positions (determined by the $k_i^d=1$ positions in the $k^d$-sequence).

Note that when there is no encryption map E involved and no error correcting code (ECC) is used, there is no difference between the ciphertext decoy mode 100 and the data decoy mode 300. In this scenario, the embedded data sequence (containing data bits and decoy bits) is the ciphertext, which may modulate classical signals or quantum signals before being transmitted down the communication channel. In general, the embedded data sequence can have an adjustable data rate (ratio of data bits to the total bits in the embedded data sequence) between 0 and 1. For example, a data rate as high as 90% or higher may be obtained in certain cases. On the other hand, a data rate as low as 0.1% or lower may be obtained in other cases.

FIG. 5A is a detailed example of embedding original data bits among a sequence of decoy bits to produce an embedded data sequence. As shown in this example of embedding 500, the original data bits 510 are embedded among the decoy bits 530 in the embedded data sequence 540, with the decoy positions determined by the pseudorandom number sequence 520 ($k^d$). For instance, the first bit in the embedded data sequence 540 is a message bit, because the first bit in the $k^d$ sequence is 1. As another example, the third bit in the embedded data sequence 540 is a decoy bit, because the third bit in the $k^d$ sequence is 0 and the map l(i) takes the first decoy bit from the decoy bits 530 (since the number of $k_i^d=0$ positions that have occurred so far is 1).

FIG. 5B is a detailed example of disembedding original data bits from the embedded data sequence. In this example of disembedding 550, the embedded data sequence 540 is compared with the pseudorandom number sequence 520 ($k^d$) to determine the decoy positions, which are the positions of 0 bits in the $k^d$ sequence. The bits in the decoy positions of the embedded data sequence 540 are determined to be decoy bits and are discarded. The remaining portion of the embedded data sequence 540 is the sequence of the original data bits 510.

Our DBM is a totally new cryptographic technique that has never been discussed in either classical or quantum cryptography. The proposed methodology is different from the clock-controlled or shrinking generator, exactly due to the use of decoy bits with corresponding data rate reduction. The DBM is also different from decoy quantum states. The use of decoy quantum states was first described in the problem of quantum bit commitment, where such states serve in a role similar in a weak sense, not essentially similar, to decoy bits in the present DBM. The different use of decoy quantum states to detect Eve's presence has become a common quantum key distribution technique for multi-photon sources which is very different from DBM other than the word "decoy". Note also that one needs to control the decoy states' characteristics for the purpose of checking Eve's presence, in contrast to DBM.

An LFSR m-Sequence Property and Some Implication

We will make basic use of the following property of a LFSR than can be chosen to yield m-sequences in its output corresponding to different input seed key K (with its running key k), which have a period of $2^{|K|}-1$ for an |K|-stage LFSR with primitive polynomial generator. Note that we would use an n-bit m-sequence only for n far less than such period, which always holds since such |K|>100 in practice. Also, each m-sequence has ideal two-level autocorrelation and different k just translates the output sequence. These imply the following:

Theorem 1:

The number of different bit positions between two L-bit m-sequences, $L=2^{|K|}-1$, from the same LFSR is L/2 for even L and 1+L/2 for odd L, when averaged over K.

Theorem 1 has the following implication. Let the bit-position average bit error rate (BER) $p_b$ for estimating the l bits in an l-bit sequence be the total number of bit errors divided by l. Let $\bar{p}_b$ be the $p_b$ averaged over the seed key of the LFSR.

Corollary 1:

If one guess an l-bit LFSR m-sequence incorrectly by another of such sequence, the $\bar{p}_b$ is ½ for even l and ½+1/(2l) for odd l.

This implies the following significant fact that is not given in the cryptography literature. If one uses LFSR m-sequence as the running key in a stream cipher, the raw security BER $\bar{p}_b$ from a ciphertext only attack (CTA) on the data is given by Corollary 1 if Eve guesses at the seed key K. Thus with a very high probability $1-2^{-|K|}$ which is practical certainty for |K|>100, we obtain perfect |K|-averaged security for any l-bit ciphertext sequence. Eve would get $p_b=½$ bit by bit if she guesses randomly. Eve's sequence error rate for an arbitrary subset of the data X is not quantified except it is uniformly random for ≤|K| consecutive positions. Thus, the n-bit data x is actually quite secure information theoretically despite the Shannon limit. When the data is a priori uniform to Eve, the key is fully protected in stream cipher mode at least. The usual security weakness of conventional symmetric-key ciphers lies in KPA, where typically the key is fully determined by |K| known data bits and only CBS can be obtained.

Security of the Decoy Bits Method

Let us examine the use of DBM (in CDM) given by Equations (3)-(4). For raw data security we see that if Eve simply guesses at the n encrypted data positions among the n' ciphertext positions without using the fact that they are generated from the m-sequence of a LFSR with a seed key $K^d$, she will have error probability $p_b(i)=½$ at each $i^{th}$ position of getting the correct encrypted bit. If she guesses $k^d$ with the LFSR structure, Corollary 1 shows that with practical certainty she still gets $\bar{p}_b=½$ for each bit position. The DBM adds to that with $p_b=½$ for each specific $k^d$ also other than a few starting bits, because the decoy positions are filled with true random numbers. For Eve's sequence success probabilities there is compound security from the additional DBM key $K^d$ in addition to the E key $K^e$. All this is expected and raw security is stronger than just $K^e$ in the expected way.

The very major difference occurs in the crucial KPA security. Without decoy bits the non-random ciphers are broken information theoretically in KPA with rather short known data length, typically just same length as the key size. In the DBM case there is exponential security where each of the possible n'-bit m-sequence from the LFSR with a seed key $K^d$ has to be tried one by one. This is because the known data to Eve has nothing to do with the decoy-position fixing m-sequence. She would need to guess at a correct $|K^d|$-run of 1's in the correct data position sequence x, since there is no longer runs of 1's than $|K^d|$. Her probability of estimating $K^d$ correctly for getting at the unknown data bits is $2^{-|K^d|}$ since $|K^d|$ consecutive data positions are needed to determine the seed key $K^d$. If she guesses incorrectly, the sequence error on $K^d$ would lead to a $\hat{Y}$ and thus $\hat{X}$ that is different from the correct one with a probability ½ in each position. This is because true-random-numbers decoy bits are used and the other ciphertext bits are also independent uniform bits when an additive stream cipher is used on uniform original data x. Indeed this holds more broadly for known x and a variety of E when E's seed key $K^e$ (unknown to Eve) is taken into account. In any event, as long as $K^d$ is incorrectly estimated the DBM succeeds in that no match of the given ciphertext could be obtained from Eve's generation of it from the known x and guessed $K^d$, thus ensuring each $K^d$ has to be tried one by one. Now we can consider the best strategy from Eve's viewpoint against a PRNG that determines the decoy positions with a pseudorandom number sequence r that satisfies the three Golomb randomness postulates, which is the case for m-sequences generated from a LFSR. In one embodiment, we let the 0 bits in r determine the decoy positions. The following is obtained when no $K^e$ is employed. The strengthening of security with $K^e$ depends on the exact E used in Eq. (3) or Eq. (5).

Theorem 2:

Under KPA the CBS of DBM with a seed key $K^d$ is $2^{|K^d|}$.

Proof:

In addition to the above guessing, it is best for Eve to minimize the probability of getting any decoy bits in a KPA by trying the minimum consecutive $|K^d|$ bit positions and hoping that it would generate the correct matching y' to the known x. From the "run property" of m-sequence, the probability that a randomly drawn $|K^d|$ consecutive bits out of the $N=2^{|K^d|}-1$ bits m-sequence are all 1 is upper bounded by $2^{-|K^d|}$ since there is only one such sequence. For n<N the probability can only be smaller. After a KPA trial failure each additional trial is of the same nature as searching for the $|K^d|$ consecutive 1's. Thus, this way of attack has a lower chance of success than guessing the key directly. Thus, Eve's optimum trial complexity of is given by Theorem 2.

Corollary 2:

The probability that M trials (of success or failure) would break the cryptosystem is $M/2^{|K^d|}$.

Note that it is quite possible a matching $K^d$ in KPA may be found which matches x and the ciphertext even though it is not the correct $K^d$, due to the many random elements involved. In such a case Eve is misled and gets a wrong estimate of $K^d$ as if it is correct. This can be formalized by the concept of unicity distance, the data length required for a KPA to pin down the seed key uniquely. While residual information theoretic security may remain even for very long known data length, it appears that for long enough n' Eve can indeed determine $K^d$ in principle in a KPA.

Note that the security considered here arises entirely from $K^d$. The use of $K^e$ is not essential classically but is used in conjunction with the KCQ approach.

The above use of LFSR gives a decoy rate of ½. The corresponding data rate is 50%. In general, the decoy rate and the corresponding data rate are adjustable. One can vary the decoy rate by using a PRNG to determine what positions to insert decoy bits at any decoy rate. If the decoy rate is higher than 50%, the corresponding data rate would become less than 50%. Furthermore, one can choose a decoy position determining mechanism that would ensure that at least one decoy bit is included in any $|K^d|$ consecutive bits. The quantitative CBS security level against KPA and ITS security level for raw security depend on the exact decoy position determining mechanism. The DBM can also be used with far less decoy bits for comparable CBS security against KPA as given by Theorem 2. This would result in a data rate as high as 90%, or even higher. This is important when the data rate reduction is to be kept as small as possible for a given security level. Alternatively, more decoy bits can be used for increased security, effectively decreasing the data rate to as low as 0.1%, or even lower.

For ease of implementation, pseudorandom numbers can be used for the decoy bits in lieu of true random numbers. The quantitative security level for pseudorandom-numbers decoy bits would remain the same as that for true-random-numbers decoy bits when less than $|K^d|$ or $|K^r|$ data bits are known to Eve, where $K^r$ is the seed key for generating the sequence of pseudorandom decoy bits.

Applications to Data Encryption, Key Generation, and Data Storage

Theorem 2 shows the CBS security level of DBM in classical direct encryption as well as classical key generation. In addition to possible residual ITS level remaining for any finite sequence of known data, there is a sense in which ITS is still obtained in any case by the meaning of Corollary 2. Indeed, the provable exponential complexity of key generation, even against KPA, shows the use of DBM is superior to public key cryptography as far as security goes for the purpose of key distribution. There is no proved security in such asymmetric key ciphers in addition to their reliance on complexity assumptions for raw security which are also weaker than exponential complexity.

There is a very significant application of DBM to data storage via classical direct encryption, to which it is immediately applicable in conventional mathematics-based ciphers in contrast to physical and especially quantum cryptography. DBM is CBS secure against KPA, also offering security guarantee that is not compromised by future development of computational power including quantum computers or algorithm development. In another embodiment, the DBM may be implemented for medical data. In yet another embodiment, the DBM may be implemented for financial data.

Applications of DBM in Quantum Cryptography

In this section we first review some salient points on QKG and QDE using the two different approaches of QKD and KCQ. We will then explain how DBM can be used in each approach. The case of classical randomization and noise is similar, because it is the quantitative advantage creation by the users that is relevant in key generation and even direct encryption. Quantum cryptography is distinguished only in that quantum effects with no classical analog are used for such advantage creation.

In QKD which involves intrusion level estimation, only key generation is possible with no direct encryption. In a QKD protocol, the presence of Eve's attack is checked by a separate sequence of quantum signals. If the intrusive level is below a certain design threshold, the users would conclude that a net key can be obtained after error correction, typically by use of an error correcting code (ECC), and then privacy amplification, typically from a privacy amplification code (PAC) that is drawn from linear universal hashing.

In a KPA on such QKD protocols, Eve keeps her quantum probe set during the protocol execution. Then she learns part of the final generated key $K^g$ when it is used, say in one-time-pad form, and tries to estimate the other data from the one-time-pad ciphertext, her knowledge of the $K^g$ segment from KPA, and the measurement result of her choice of quantum measurement made with all her then available information. Proper advantage creation would hopefully entail that the users could derive more information on the input data from their ciphertext signals than that by Eve from her ciphertext signals. Note that the ciphertext signals in the two cases are different, always in active attacks but often so even in a passive attack in which Eve just takes in a portion of each transmitted ciphertext signal by beam-splitting. It is a difficult task to prove any general security against joint (coherent) attacks, with serious quantitative problems at several turns. In the next section it will be shown how provable ITS is readily obtained with our DBM.

There is another approach to QKG and QDE, called KCQ (keyed communication in quantum noise). In this approach, the optimal quantum receiver principle for M-ary quantum detection is used, which is one form of no-cloning in that the optimal quantum measurement depends on the specific signal set. There is no universal measurement that is optimal for different signal sets in contrast to the classical case. This KCQ underlying principle is evidently stronger than the usual no-cloning in several ways. As a consequence, intrusion level estimation can be dispensed with entirely and large-energy signals can be used, thereby greatly improving the efficiency of the cryptosystem, and as it turns out, its security also. The key point for the possible secure use of LFSR lies in our theorems 1-2 and corollaries 1-2 above, which are new. Only security against collective attacks can be quantified similar to the QKD case, although in QKD it is erroneously but widely believed otherwise.

Now let us examine DBM in QKG and QDE. The DBM can be directly applied to quantum signals modulated by the original data bits. User A just inserts random numbers into the decoy positions instead. Demodulation, decoding, and decryption would go forward as usual. The raw ITS security of DBM from corollary 1 is already ideal without quantum advantage creation.

The crucial point for DBM quantum cryptography is that Eve could only make one measurement on her probe. In both QKD and KCQ, the correct measurement which varies from qubit to qubit (or qumode) is needed to extract data information with no distortion. In a KPA, Eve needs to make a measurement upon her guess of the seed key $K^d$ for all the qubits and has a probability of success $2^{-|K^d|}$, or she could try $|K^d|$-run of 1's. In such case she would not have the same probability of success $\sim 2^{-|K^d|}$ in each trial with a small increase from the decrease of the $2^{|K^d|}-1$ sample space size after m trials by just m. This is because during the first trial the quantum measurement already fixes the $K^d$ positions and Eve could try only $n_0/|K^d|$ cases instead of $n_0-|K^d|+1$ in the classical situation (the other ones do not have the necessary quantum freedom). Here $n_0$ is the length of the known consecutive data bits. The encryption of the data bits by E of Equations (1)-(2) which involve measurement choice by Eve in this situation decreases the success probability by a lot, but which we ignore since she is already bound $\sim 2^{-|K^d|}$ without taking that into account.

The above shows that Eve could not try all the $2^{|K^d|}$ cases as in the classical situation, thus gaining ITS in QDE. The only remaining general way is to make a universal measurement on the qubits or qumodes that would render the whole situation a classical one. We will now give the ITS KPA security for QDE under such a universal measurement. We have the following:

Theorem 3:
The KPA security of KCQ direct encryption under DBM is given by the user's probability levels of correctly making the bit decisions versus that from a universal measurement.

Proof:
When Eve launches a universal measurement attack, she would get the measurement result incorrectly for the given signal set with a probability of $p_e^E$ for either binary or M-ary signals:

$$p_e^E \sim 2^{-\lambda_e}, p_e^B \sim 2^{-\lambda_s}, \lambda_e, \lambda_u > 1 \tag{7}$$

In Eq. (7), $p_e^E$ depends on the specific signal set and the universal measurement, and $p_e^B$ is the users' corresponding error probability before ECC. Under universal measurement Eve's $K^d$-averages success probability $P_e^E \equiv 1-P_e^E$ for each KPA trial is given by $$\bar{p}_c^E = \sum_{r=0}^{|K^d|} 2^{-2r}(1-2^{-\lambda_e})^{n-r} \qquad (8)$$

Thus, the user's advantage $\lambda_u > \lambda_e$ shows that an ECC can be found for the user but with remaining errors for Eve as given in Eq. (8), providing ITS security in KPA on top of $K^d$ and any shared secret key.

The advantage over Eve from Eq. (7) is to be obtained from the KCQ approach, which involves encryption over a $K^e$. To get true ITS in QKG, such $K^e$ use is necessary in contrast to the classical case where $K^e$ may be dispensed with for CBS or its induced ITS.

In a direct QKG approach, one may bound Eve's overall average probability of identifying the whole data n-sequence and then employ PAC on top, dealing with ECC separately. The corresponding general case is complicated and will be presented elsewhere. However, under universal measurement the usual theory for QKD as well as KCQ can be directly applied for key generation with ITS.

Note that DBM is well suited to QKD by using $K^d$ to choose the sifted key and the remaining for checking the quantum bit error rate (QBER). For instance, the qubits to be checked for QBER may be selected from the decoy positions (determined by PRNGs with a shared secret seed key $K^d$). In this case, the qubits in the selected decoy positions serve an additional useful purpose of checking QBER, prior to being discarded. The qubits in the non-decoy positions are thus maximally preserved to generate the sifted key. Note also that loss effect and all system imperfection problems are automatically resolved in DBM from the decoy bits.

We have described a very powerful new cryptographic technique, the decoy bits method, which is widely applicable to different media of transmission and storage in various cryptographic functions, classical or quantum. Most significantly, it allows rigorous general security proofs for the first time ever in cryptography, other than one-time pad.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program instructions, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which includes any type of tangible media suitable for storing electronic instructions, and coupled to a computer system bus. Furthermore, any computing systems referred to in the specification may include a single processor or may be architectures employing multiple processor designs for increased computing capability.

Although the detailed description contains many specifics, these should not be construed as limiting the scope of the invention but merely as illustrating different examples and aspects of the invention. It should be appreciated that the scope of the invention includes other embodiments not discussed in detail above. For example, the DBM can be used at many different data rates which are suitable for different kinds of applications, such as financial, medical, internet, military, etc. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A computer-implemented method for securing data, the method comprising:
   receiving a sequence of data bits;
   generating a sequence of decoy bits; and
   producing an embedded data sequence by embedding the sequence of data bits among the sequence of decoy bits based on a decoy position determining mechanism to produce an embedded data sequence;
   modulating quantum signals by the embedded data sequence;
   wherein the embedding comprises:
   generating a pseudorandom number sequence based on an encryption key and an encryption mechanism; and
   embedding the sequence of data bits among the sequence of decoy bits based on the pseudorandom number sequence to produce the embedded data sequence;
   wherein the sequence of data bits is an encrypted data sequence encrypted using a separate encryption key and a separate encryption mechanism;
   wherein a transmitting party transmits the quantum signals to a receiving party for quantum key distribution, the quantum signals are qubits, and the receiving party shares the encryption key and the encryption mechanism with the transmitting party, further comprising:
   demodulating, by the receiving party, the quantum signals into a received embedded data sequence;
   generating, by the receiving party, a second pseudorandom number sequence based on said encryption key and said encryption mechanism;
   determining, by the receiving party, positions of the decoy bits in the received embedded data sequence based on the second pseudorandom number sequence; and
   selecting, by the receiving party, bits in the determined positions of the decoy bits from the received embedded data sequence for checking quantum bit error rate.

2. The method of claim 1 wherein positions of 1 bits in the pseudorandom number sequence determine positions of the data bits in the embedded data sequence and positions of 0 bits in the pseudorandom number sequence determine positions of the decoy bits in the embedded data sequence.

3. The method of claim 1, further comprising:
modulating classical signals by the embedded data sequence.

4. The method of claim 1 wherein the encrypted data sequence is generated using at least one of AES and LFSR.

5. The method of claim 1 wherein the encrypted data sequence is generated using a stream cipher.

6. The method of claim 1 wherein the encrypted data sequence is generated using a block cipher.

7. The method of claim 1 wherein the separate encryption key is a sequence of true random numbers.

8. The method of claim 1, further comprising:
encrypting the embedded data sequence using a distinct encryption key and a distinct encryption mechanism to produce an encrypted data sequence.

9. The method of claim 8, further comprising:
modulating quantum signals by the encrypted data sequence.

10. The method of claim 8, further comprising:
modulating classical signals by the encrypted data sequence.

11. The method of claim 8 wherein the encrypted data sequence is generated using at least one of AES and LFSR.

12. The method of claim 8 wherein the encrypted data sequence is generated using a stream cipher.

13. The method of claim 8 wherein the encrypted data sequence is generated using a block cipher.

14. The method of claim 8 wherein the distinct encryption key is a sequence of true random numbers.

15. The method of claim 1 wherein the sequence of decoy bits is generated in a pseudorandom manner.

16. The method of claim 1 wherein the sequence of decoy bits is generated in a true random manner.

17. The method of claim 1 wherein the encryption key is a sequence of true random numbers.

18. The method of claim 1 wherein the embedded data sequence has a data rate greater than or equal to 90%.

19. The method of claim 1 wherein the embedded data sequence has a data rate less than or equal to 0.1%.

20. The method of claim 1 wherein the embedded data sequence has an adjustable data rate between 0 and 1.

21. A computer-implemented method for securing data, the method comprising:
receiving a sequence of data bits;
generating a sequence of decoy bits;
producing an embedded data sequence by embedding the sequence of data bits among the sequence of decoy bits;
encrypting the embedded data sequence using a distinct encryption key and a distinct encryption mechanism to produce an encrypted data sequence;
modulating quantum signals by the encrypted data sequence;
demodulating, by the receiving party, the quantum signals into a received encrypted data sequence;
decrypting, by the receiving party, the received encrypted data sequence into a received embedded data sequence;
generating, by the receiving party, a second pseudorandom number sequence based on said encryption key and said encryption mechanism;
determining, by the receiving party, positions of the decoy bits in the received embedded data sequence based on the second pseudorandom number sequence; and
selecting, by the receiving party, bits in the determined positions of the decoy bits from the received embedded data sequence for checking quantum bit error rate;
wherein the embedding comprises:
generating a pseudorandom number sequence based on an encryption key and an encryption mechanism, and
embedding the sequence of data bits among the sequence of decoy bits based on the pseudorandom number sequence to produce the embedded data sequence;
wherein a transmitting party transmits the quantum signals to a receiving party for quantum key distribution, the quantum signals are qubits, and the receiving party shares the encryption key and the encryption mechanism with the transmitting party.

22. A non-transitory computer readable medium, having stored thereon, instructions for causing a computer to perform a method comprising:
receiving a sequence of data bits;
generating a sequence of decoy bits;
producing an embedded data sequence by embedding the sequence of data bits among the sequence of decoy bits;
modulating quantum signals by the embedded data sequence;
wherein the embedding comprises:
generating a pseudorandom number sequence based on an encryption key and an encryption mechanism; and
embedding the sequence of data bits among the sequence of decoy bits based on the pseudorandom number sequence to produce the embedded data sequence;
wherein the sequence of data bits is an encrypted data sequence encrypted using a separate encryption key and a separate encryption mechanism;
wherein a transmitting party transmits the quantum signals to a receiving party for quantum key distribution, the quantum signals are qubits, and the receiving party shares the encryption key and the encryption mechanism with the transmitting party, further comprising:
demodulating, by the receiving party, the quantum signals into a received embedded data sequence;
generating, by the receiving party, a second pseudorandom number sequence based on said encryption key and said encryption mechanism;
determining, by the receiving party, positions of the decoy bits in the received embedded data sequence based on the second pseudorandom number sequence; and
selecting, by the receiving party, bits in the determined positions of the decoy bits from the received embedded data sequence for checking quantum bit error rate.

23. A non-transitory computer readable medium, having stored thereon, instructions for causing a computer to perform a method comprising:
receiving a sequence of data bits;
generating a sequence of decoy bits;
producing an embedded data sequence by embedding the sequence of data bits among the sequence of decoy bits;
encrypting the embedded data sequence using a distinct encryption key and a distinct encryption mechanism to produce an encrypted data sequence;
modulating quantum signals by the encrypted data sequence;
demodulating, by the receiving party, the quantum signals into a received encrypted data sequence;
decrypting, by the receiving party, the received encrypted data sequence into a received embedded data sequence;
generating, by the receiving party, a second pseudorandom number sequence based on said encryption key and said encryption mechanism;
determining, by the receiving party, positions of the decoy bits in the received embedded data sequence based on the second pseudorandom number sequence; and selecting, by the receiving party, bits in the determined positions of the decoy bits from the received embedded data sequence for checking quantum bit error rate;
wherein the embedding comprises:
generating a pseudorandom number sequence based on an encryption key and an encryption mechanism, and
embedding the sequence of data bits among the sequence of decoy bits based on the pseudorandom number sequence to produce the embedded data sequence;
wherein a transmitting party transmits the quantum signals to a receiving party for quantum key distribution, the quantum signals are qubits, and the receiving party shares the encryption key and the encryption mechanism with the transmitting party.

* * * * *